United States Patent [19]

Ishikawa et al.

[11] Patent Number: 5,721,609

[45] Date of Patent: Feb. 24, 1998

[54] EXPOSURE APPARATUS WITH A PLZT SHUTTER WHICH RECEIVED LIGHT FROM A PROJECTING MEANS CAPABLE OF SEQUENTIALLY GENERATING RED, BLUE AND GREEN LIGHT

[75] Inventors: Masazumi Ishikawa; Tohru Tanibata, both of Wakayama-ken, Japan

[73] Assignee: Noritsu Koko Co., Ltd., Wakayama-ken, Japan

[21] Appl. No.: 554,983

[22] Filed: Nov. 13, 1995

[30] Foreign Application Priority Data

Nov. 11, 1994 [JP] Japan ................. 6-277932

[51] Int. Cl.⁶ .................................. G03B 27/72
[52] U.S. Cl. .................. 355/71; 355/69; 355/32; 355/35; 355/37
[58] Field of Search ................. 355/67, 69, 70, 355/71, 32, 35, 37

[56] References Cited

U.S. PATENT DOCUMENTS

| | | | |
|---|---|---|---|
| 4,827,434 | 5/1989 | Hanau et al. | 364/526 |
| 4,831,436 | 5/1989 | Birgmeir et al. | 358/75 |
| 4,868,677 | 9/1989 | Tompane | 358/302 |
| 4,937,616 | 6/1990 | Maeda et al. | 355/37 |
| 4,949,185 | 8/1990 | Nakai | 358/300 |
| 4,996,555 | 2/1991 | Takemoto et al. | 355/44 |
| 5,029,989 | 7/1991 | Phillips | 350/355 |
| 5,070,411 | 12/1991 | Suzuki | 358/302 |
| 5,262,888 | 11/1993 | Morishita et al. | 359/245 |
| 5,390,000 | 2/1995 | Tanibata | 355/71 |
| 5,457,530 | 10/1995 | Nagai | 356/330 |
| 5,463,445 | 10/1995 | Suzuki | 355/71 |
| 5,488,450 | 1/1996 | Tanibata | 355/38 |

FOREIGN PATENT DOCUMENTS 87-92636 4/1987 Japan.

*Primary Examiner*—Arthur T. Grimley
*Assistant Examiner*—Shival Virmani
*Attorney, Agent, or Firm*—Wenderoth, Lind & Ponack

[57] ABSTRACT

An intensity of light emitted from a lamp is passed through a mirror tunnel and is directed to a disk which comprises three, B, G, and R, color filters, each extending 120 degrees on the disk. Each of the B, G, and R modes of light, separated on the disk, is guided through the optical fiber bundle and is transmitted to the PLZT elements. A pattern of the PLZT elements, determined by a group of dots of exposure data to be printed, are energized by a given voltage in synchronization with the rotation of the disk 13, thus allowing a desired mode or wavelength of light to pass selectively and fall efficiently on the printing paper.

6 Claims, 4 Drawing Sheets

EXPOSURE APPARATUS WITH A PLZT SHUTTER WHICH RECEIVED LIGHT FROM A PROJECTING MEANS CAPABLE OF SEQUENTIALLY GENERATING RED, BLUE AND GREEN LIGHT

BACKGROUND OF THE INVENTION

The present invention relates to an exposure apparatus for use in a photographic printer and more particularly, to a digital exposure apparatus provided with a PLZT shutter.

Such a conventional digital exposure apparatus provided with a PLZT shutter is known in which when a photosensitive material is exposed to the three primary colors, blue, green, and red (referred to as B, G, and R modes hereinafter in this application), of light in a sequence, it has to be moved to and from multiple times with its PLZT elements energized by corresponding levels of voltage.

It is however disadvantageous that the photosensitive material is moved to and from multiple times in the conventional exposure apparatus and the overall processing action will hardly be hurried up.

Also, it is very hard to move the photosensitive material at a considerable rate of accuracy. If the accuracy is declined, the exposure actions to the B, G, and R modes of light may be varied in position.

It is thus an object of the present invention to provide an improved apparatus capable of increasing the speed of handling and preventing any discrepancy of the exposure location to the B, G, and R modes of light while eliminating undesired forward and backward movements of a photosensitive material.

SUMMARY OF THE INVENTION

An exposure apparatus according to the present invention is provided with a PLZT shutter for exposing a photosensitive material to three, B, G, and R, modes of light produced in dot form by color separation of an image into rows of dots, and in particular, comprises: a conveying means for transferring the photosensitive material by a distance of one dot size; an exposure light switching means for shifting on a row-by-row basis the exposure light to a desired one of the three, B, G, and R, modes; and a voltage switching means for shifting, in synchronization with the shifting of the mode of each row, the voltage to be impressed on each PLZT element to a level corresponding to the desired mode of light of a dot.

The exposure apparatus of the present invention allows its PLZT shutter to expose the photosensitive material to a desired one of the B, G, and R modes of light in each row of dots by shifting the voltage to be impressed on each PLZT element to a level corresponding to the desired mode of a dot in synchronization with the shifting of the mode of each row. Accordingly, the desired mode of light is only passed through the PLZT element to produce a color dot on the photosensitive material.

The photosensitive material is then advanced the distance of one dot size by the conveying means upon completion of the exposure actions of one row and exposed to form another row of dots.

The PLZT shutter comprises multiple rows of the PLZT elements, each row extending at a right angle to the transfer direction of the photosensitive material. This allows a predetermined area of the photosensitive material to be exposed at once.

DETAILED DESCRIPTION OF THE PREFERRED EMBODIMENT

One embodiment of the present invention will be described in the form of an exposure apparatus installed in a photographic printer, referring to the accompanying drawings.

Figure 1:
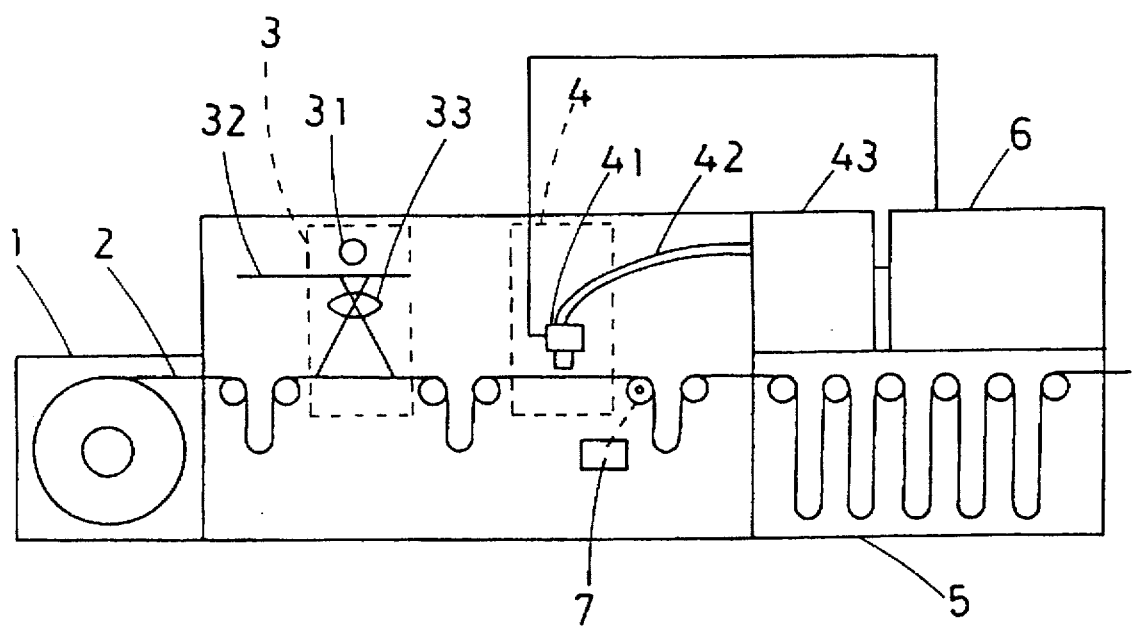
FIG. 1 is an overall schematic view of a photographic printer equipped with an exposure apparatus according to the present invention.
Figure 2:
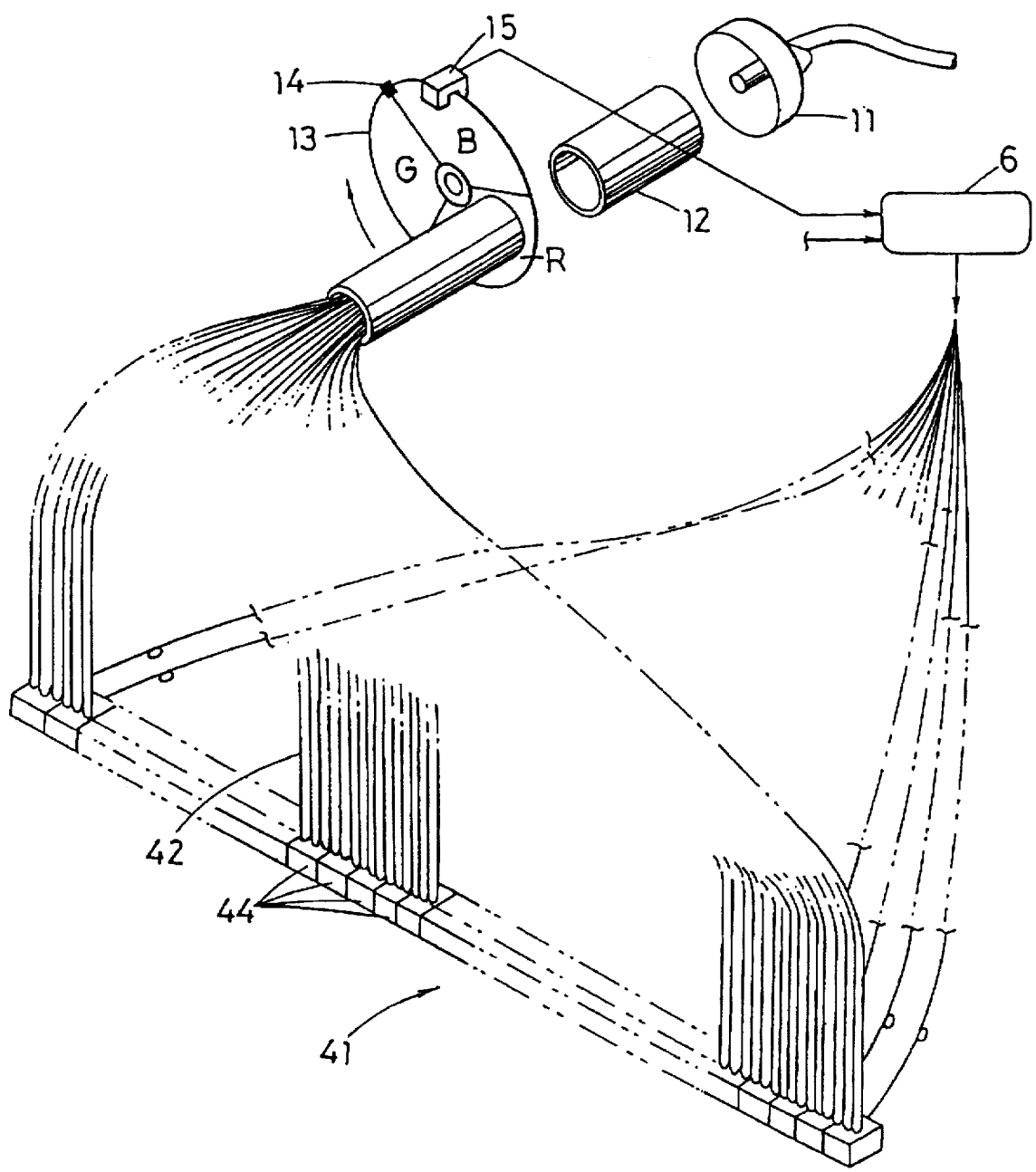
FIG. 2 is a schematic view showing a primary part of the photographic printer.

FIG. 1 is an overall schematic view of the photographic printer and FIG. 2 is a schematic view showing a primary part of the same.

As shown in FIG. 1, there are a magazine 1 for supply of a printing paper as the photosensitive material, the printing paper 2, a negative exposure station 9 where an image on a negative film is projected, a line exposure station 4 where a digital image is projected, a development processor 5 for developing process of the printing paper 2 on which the images are printed, and a transfer mechanism 7 arranged as a conveying means for conveying the printing paper 2 lengthwisely on a dot-by-dot and frame-by-frame basis. Also, a line exposure controller 6 is provided which serves as a voltage switching means to control the timing of exposure actions at the line exposure station 4 and the timing of conveying action of the transfer mechanism 7.

At the negative exposure station 3, an image in a negative 32 is focused through a lens 33 on the printing paper 2 under exposure.

As shown in FIGS. 1 and 2, the line exposure station 4 produces dots of exposure data from a digital image read with a scanner or created by an electronic device such as a computer and allows them to be printed on the printing paper 2 through exposure action.

The line exposure station 4 comprises a PLZT shutter 41 having multiple rows of PLZT elements 44 arranged widthwisely of the printing paper 2, a multiplicity of optical fiber materials 42, and a PLZT light source 43 for transmitting B, G, and R modes of light through a bundle of the optical fiber materials 42. The PLZT light source 43 includes an exposure light switching means.

An intensity of light emitted from a lamp 11 is passed through a mirror tunnel 12 and directed to a disk 13 which comprises three, B, G, and R, color filters, each extending through 120 degrees. Each of the B, G, and R modes of light separated by the disk 13 is guided through the optical fiber bundle 42 and transmitted to the PLZT elements 44.

A pattern of the PLZT elements 44 determined by a group of dots of exposure data to be printed are energized by a given voltage in synchronization with the rotation of the disk 13 and thus allows a desired mode or wavelength of light separated by the disk 13 to pass selectively and fall efficiently on the printing paper 2.

The movement of the disk 13 is identified for timing by a sensor 15 detecting a mark 14 on the disk 13. As the disk 13 rotates, its three filters run in an order of B, G, and R across an optical axis of the optical fiber bundle 42. The mark 14 is located at the boundary between the B and G mode filters and the sensor 15 is spaced 120 degrees from the optical axis of the optical fiber bundle 42.

Figure 3:
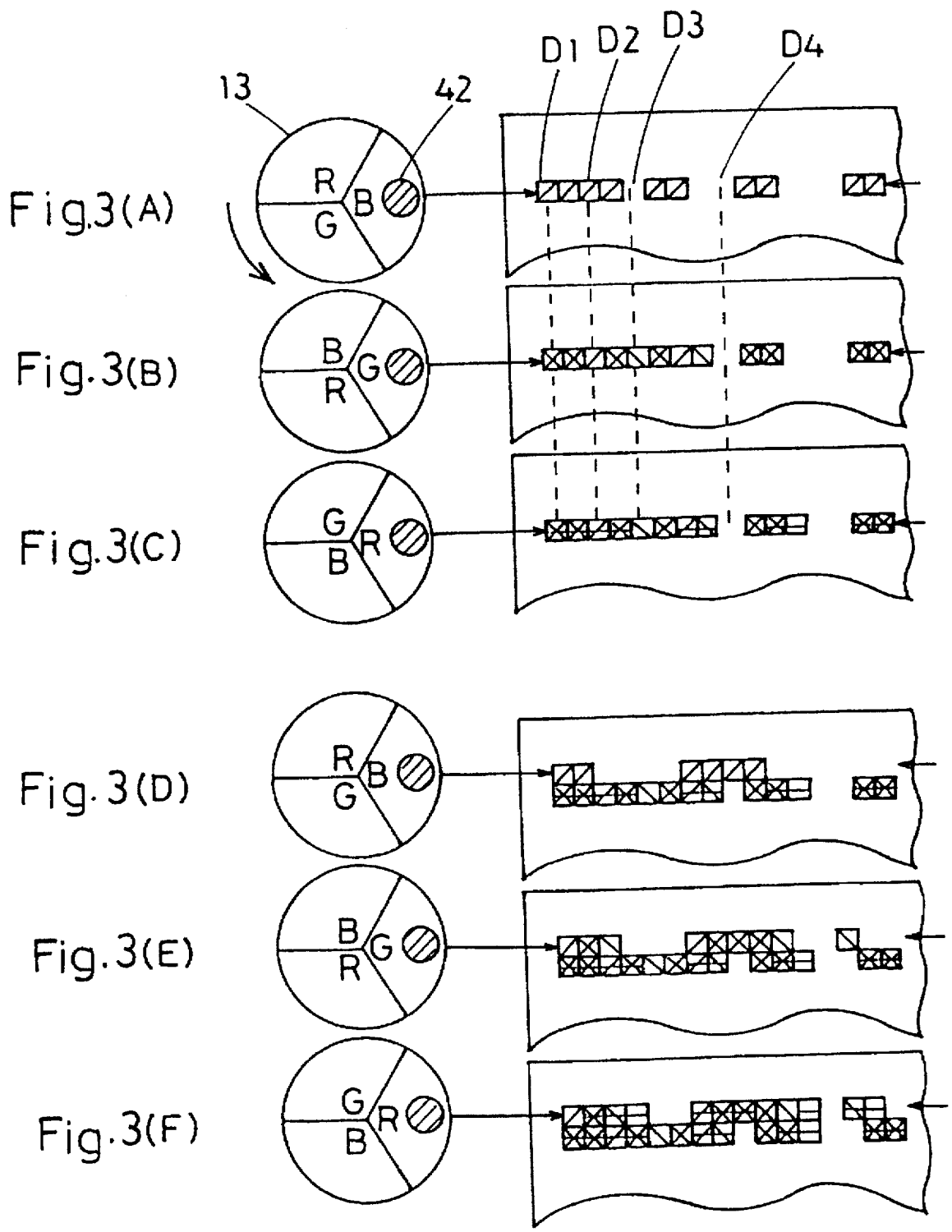
FIG. 3 is a diagram explaining exposure steps.

The timing for exposure actions for B, G, and R modes will be explained referring to FIGS. 2, 3, and 4.

The procedure starts with Step S1 where the mark 14 on the disk 13 is detected with the sensor 15. It is thus judged that the B mode filter has just been initiated to run 120 degrees. At Step S2, the line exposure controller 6 is actuated to shift the voltage to be impressed on the PLZT elements 44 to 45 V. Accordingly, B mode light of data passed through the B mode filter is transmitted to produce a pattern of dots D1, D2, ... on the printing paper 2, as shown in FIG. 3(A).

As it is detected from the mark 14 that the disk 13 has rotated 120 degrees, the G mode filter is now engaged. Then, the line exposure controller 6 is actuated to shift the voltage to be impressed on the PLZT elements 44 to 50 V. Accordingly, G mode light of data passed through the G filter is introduced to produce another pattern of dots D1, D3, ... on the printing paper 2, as shown in FIG. 3(B).

It is then found by detection of a further 120-degree movement of the disk 13 that the R filter is now in place. The line exposure controller 6 is hence actuated to shift the voltage to be impressed on the PLZT elements 44 to 55 V. Accordingly, R mode light of data passed through the R filter is allowed to produce a further pattern of dots D1, D2, ... on the printing paper 2, as shown in FIG. 3(C).

As the result of the preceding steps, the dot D1 is filled with three, B, G, and R, colors while the dot D2 having two, R and R, colors overlapped each other, the dot D3 having only the G color, D4 having no color, and so on.

While being exposed to the B, G, and R modes of light in a sequence, the printing paper 2 remains paused. This allows a widthwisely extending row of dots to be printed on the printing paper 2. After a sequence of the steps shown in FIG. 4 is completed, the printing paper 2 is advanced a distance of one dot size.

Then, the exposure action is repeated at the one-dot behind location on the printing paper 2 as shown in FIGS. 3(D) to 3(F).

Figure 4:
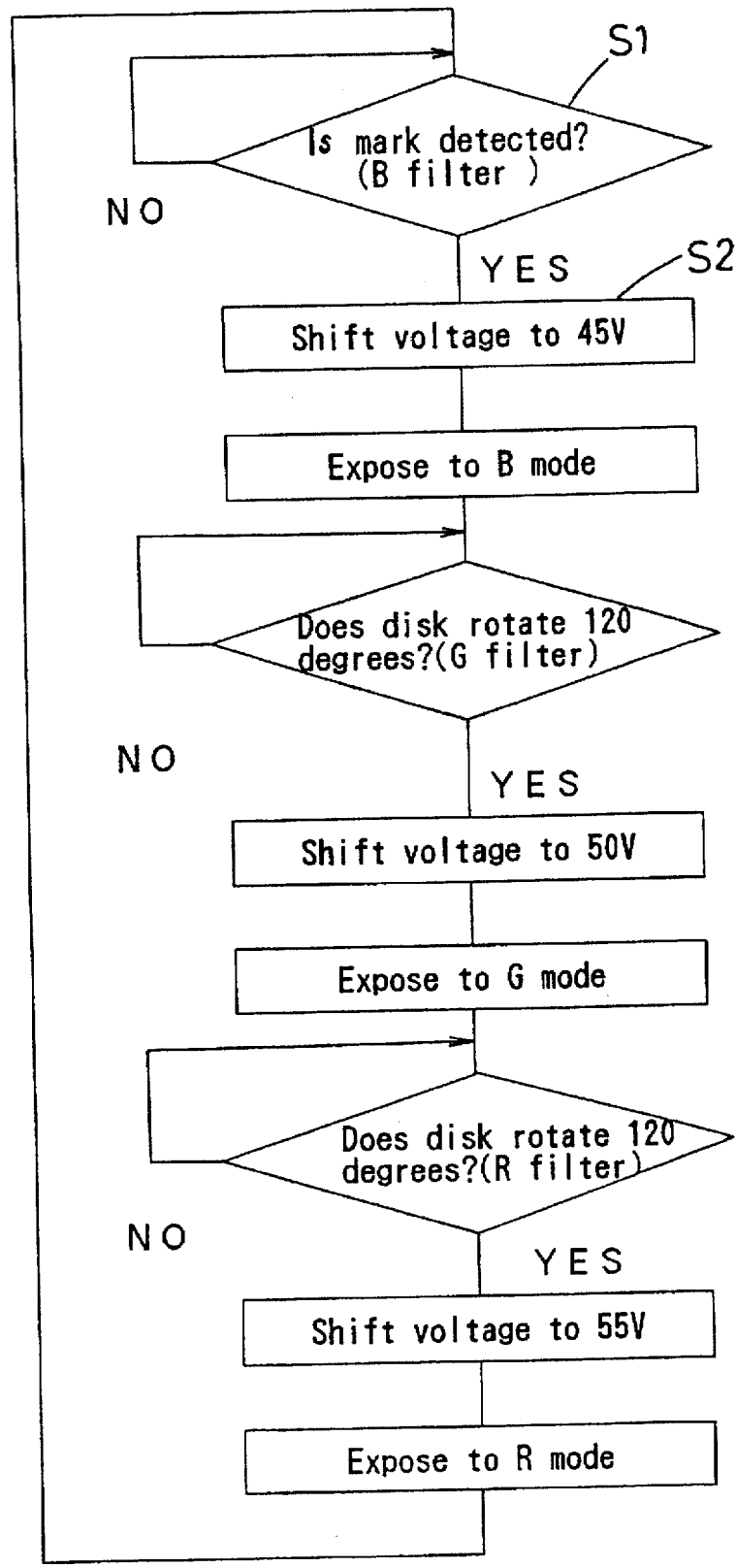
FIG. 4 is a flowchart of the exposure steps.

Similarly, the steps shown in FIG. 4 are performed in synchronization with the rotating movement of the disk 13 for producing another row of dots of the B, G, and R colors.

This action is followed by further advancing the printing paper 2 by the distance of one dot size.

As the result, rows of dots are printed lengthwisely of the printing paper 2 through exposure actions on a row-by-row basis.

The printing paper 2 exposed at the negative exposure station 3 and/or the line exposure station 4 is then transferred to the development processor 5 where it is subjected to developing process and separated into prints of a frame size.

The 120-degree movement of the disk 13 may be controlled by pulses of a stepping motor, by action of a rotary encoder, or by detection of equally 120-degree spaced marks on the disk.

It would be understood that the exposure apparatus of the present invention is not limited to the use in a photographic printer but is operable with any type of photosensitive materials.

We claim:

1. An exposure apparatus for exposing a photosensitive material to images of a plurality of red, blue, and green dots, the exposure apparatus having PLZT shutters composed of a plurality of PLZT elements, comprising:

a projecting means for sequentially generating red, blue, and green color light, wherein the red, blue, and green color light is received by the PLZT elements; and a means for switching the level of voltage supplied to the PLZT elements according to the particular color of light being received by the PLZT elements, wherein the level of voltage supplied to the PLZT elements is switched synchronously with a changing of the color of light being generated by said projecting means.

2. The exposure apparatus of claim 1, wherein the level of voltage supplied to the PLZT elements corresponding to red, green and blue light is 55V, 50V and 45V, respectively.

3. An exposure apparatus for exposing a photosensitive material to images of a plurality of red, blue, and green dots, the exposure apparatus having PLZT shutters composed of a plurality of PLZT elements, comprising:

a projecting means for sequentially generating red, blue, and green color light, wherein the red, blue, and green color light is received by the PLZT elements;

a conveying means for moving the photosensitive material by a distance of one dot size;

a detecting means for detecting at least one time the light being generated by said projecting means is changed to red, blue, and green colors; and a controlling means for determining when the light being generated by said projecting means is changed and for switching the level of voltage supplied to the PLZT elements according to the particular color of light being received by the PLZT elements, wherein the level of voltage supplied to the PLZT elements is switched synchronously with a change of light detected by said detecting means.

4. The exposure apparatus of claim 3, wherein the level of voltage supplied to the PLZT elements corresponding to red, green and blue light is 55V, 50V and 45V, respectively.

5. An exposure apparatus for exposing a photosensitive material to images of a plurality of red, blue, and green dots, the exposure apparatus having PLZT shutters composed of a plurality of PLZT elements, comprising:

a projecting means for sequentially generating red, blue, and green color light, wherein the red, blue, and green color light is received by the PLZT elements;

a conveying means for moving the photosensitive material by a distance of one dot size;

a detecting means for detecting each time the color of light being generated by said projecting means is changed; and a controlling means for switching the level of voltage supplied to the PLZT elements according to the particular color of light being received by the PLZT elements, wherein the level of voltage supplied to the PLZT elements is switched synchronously with a change of light detected by said detecting means.

6. The exposure apparatus of claim 5, wherein the level of voltage supplied to the PLZT elements corresponding to red, green and blue light is 55V, 50V and 45V, respectively.

* * * * *

UNITED STATES PATENT AND TRADEMARK OFFICE
CERTIFICATE OF CORRECTION

PATENT NO.  : 5,721,609
DATED       : February 24, 1998
INVENTOR(S) : Masazumi ISHIKAWA et al.

It is certified that error appears in the above-identified patent and that said Letters Patent is hereby corrected as shown below:

On the Cover Page, correct the Assignee information to be:

--[73] Assignee: Noritsu Koki Co., Ltd.
                 Wakayama-ken, Japan--.

Signed and Sealed this

Sixteenth Day of June, 1998

Attest:

BRUCE LEHMAN

Attesting Officer

Commissioner of Patents and Trademarks